United States Patent
Berthomieu et al.

(10) Patent No.: US 7,121,186 B2
(45) Date of Patent: Oct. 17, 2006

(54) PNEUMATIC SERVO UNIT, METHOD FOR MAKING SAME AND DEVICE

(75) Inventors: Bruno Berthomieu, Barcelona (ES); Juan Simon Bacardit, Barcelona (ES); Fernando Sacristan, Cabrils (ES)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/540,088

(22) PCT Filed: Dec. 17, 2003

(86) PCT No.: PCT/EP03/14372

§ 371 (c)(1),
(2), (4) Date: Jun. 20, 2005

(87) PCT Pub. No.: WO2004/056636

PCT Pub. Date: Jul. 8, 2004

(65) Prior Publication Data

US 2006/0037468 A1 Feb. 23, 2006

(30) Foreign Application Priority Data

Dec. 20, 2002 (FR) .................................. 02 16463

(51) Int. Cl.
*B60T 13/575* (2006.01)
*B60T 13/52* (2006.01)

(52) U.S. Cl. ..................................... 91/369.2

(58) Field of Classification Search ............... 91/369.2, 91/369.3
See application file for complete search history.

(56) References Cited

U.S. PATENT DOCUMENTS

| 4,892,027 | A | | 1/1990 | Wagner et al. | |
|---|---|---|---|---|---|
| 5,367,942 | A | * | 11/1994 | Nell et al. | 91/376 R |
| 5,699,713 | A | * | 12/1997 | Mortimer | 91/369.2 |
| 6,802,240 | B1 | * | 10/2004 | Kobayashi | 91/369.2 |
| 6,931,979 | B1 | * | 8/2005 | Bacardit et al. | 91/369.2 |

FOREIGN PATENT DOCUMENTS

| DE | 10113292 | 9/2002 |
|---|---|---|
| FR | 2820388 | 8/2002 |
| FR | 2825058 | 11/2002 |
| WO | 02064411 | 8/2002 |

* cited by examiner

*Primary Examiner*—Thomas E. Lazo
(74) *Attorney, Agent, or Firm*—Leo H McCormick, Jr.; Sarah Taylor

(57) ABSTRACT

A pneumatic servomotor for an assisted braking including an emergency-braking assistance device to increase the assistance ratio when an input force is applied to the control rod that is higher than a predetermined value through an extrusion of the reaction disk. The device (D) has a plastically-deformable first member (68) and second member (74) to accurately set a jump height of the servomotor and the activation force.

17 Claims, 6 Drawing Sheets

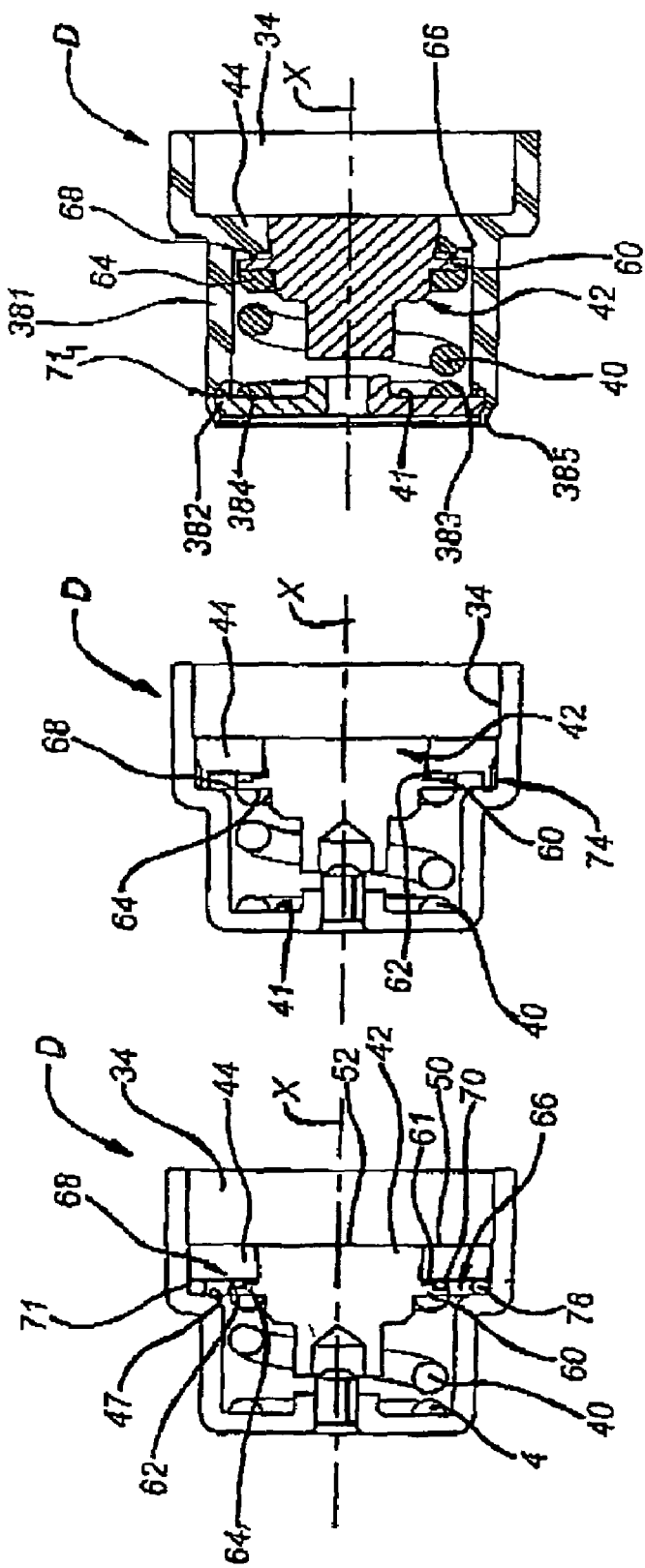

PNEUMATIC SERVO UNIT, METHOD FOR MAKING SAME AND DEVICE

The present invention mainly relates to a pneumatic servomotor for an assisted braking, fitted with an emergency-braking assistance device, and it also relates to a manufacturing process for such a servomotor and to a device for the implementation of said process. More particularly, this pneumatic servomotor for an assisted braking, fitted with an emergency-braking assistance device, makes it possible to increase the assistance ratio beyond a given force, applied to the control rod.

A pneumatic servomotor for an assisted braking, fitted with an emergency-braking assistance device, is known from the unpublished document FR 01/02 105. In a well-known manner, the servomotor comprises a casing consisting of a first shell and of a second shell defining an inner space, which is divided by a skirt, mounted for an airtight sliding motion inside the casing, into a low-pressure chamber and a variable-pressure chamber. The skirt receives, in its middle part, a pneumatic piston travelling together with the skirt and fitted, at its rear part, with a three-way valve which is controlled by an actuating rod connected with the brake pedal. At rest, the three-way valve connects the low-pressure chamber with the variable-pressure chamber and, on a braking operation, it isolates the low-pressure chamber from the variable-pressure chamber and connects the latter to the atmospheric-pressure ambient air.

The pneumatic servomotor for an assisted braking also comprises a push rod, actuating a piston of a master cylinder and capable of being moved in the course of a braking operation, under the action of the actuating rod and of the pneumatic piston. A reaction disk is accommodated in a housing, integral with the rear end of the push rod and it participates in three forces, namely a first force applied by the actuating rod through a finger, a second force applied by the pneumatic piston, and a third force exerted by the master cylinder and called the hydraulic reaction force of the braking circuit. The reaction disk is made of a substantially incompressible material, e.g. rubber.

The servomotor also comprises an emergency-braking assistance device, thanks to which the assistance ratio may be changed and, in an advantageous manner, increased.

An assistance ratio means the ratio of the output force at the push rod to the input force applied to the control rod. Yet, as far as the so-called comfort driving is concerned, in the course of which emergency braking operations are quite infrequent, there is no need for a high assistance ratio to be constantly available.

Therefore, a servomotor has been provided, which comprises an emergency-braking device making it possible, when the force exerted on the brake pedal is higher than a predetermined value, to increase the assistance ratio and thus facilitate a quick stopping of the vehicle. The emergency-braking device is arranged in the push rod inside the housing for the reaction disk, and it comprises a resilient element which becomes deformed when the force applied to the brake pedal is higher than the predetermined force, and which is compressively fitted between a rear face of the push rod and a floating element, in contact with the reaction disk. The reaction disk is also in contact with an annular ring surrounding the floating element without any clearance, and integral with the push rod. Consequently, on a braking operation during which the force applied to the brake pedal is higher than said predetermined value, the resilient element becomes compressed, thus permitting an axial forward travel of the floating element and a forward extrusion of the reaction disk. It results in a change in the distribution of the reaction from the master cylinder onto the plunger and accordingly in a modified assistance ratio.

Therefore, the prestress of the resilient element or of the spring of the emergency-braking device defines accurately the threshold force beyond which the assistance ratio is increased, which means that the prestress of the spring must be determined most accurately. As a matter of fact, at the present time, the adjustment of the prestress of the spring is somewhat inaccurate, because it is carried out by means of shims, taking into consideration a given length of the spring. But, owing to the high stiffness of the spring, it results in a large scattering of the threshold value of the triggering force as regards the emergency-braking assistance device.

Besides, the value of the jump of the servomotor is determined by the relative position of the floating element and of the annular ring and, more particularly, by the axial position of the floating element face in contact with the reaction disk and that of the annular ring face in contact with the reaction disk, which means that the floating element face in contact with the reaction disk should be disposed with a known clearance relative to the face of the surrounding annular ring, in contact with the reaction disk.

Therefore, it is an object of the present invention to provide a servomotor, fitted with an emergency-braking assistance device ensuring two assistance ratios with a high triggering accuracy.

Another object of this invention consists in providing a servomotor, fitted with an emergency-braking assistance device, having a determined jump height.

It is also an object of the present invention to provide a simple and effective manufacturing process for said servomotor.

These objects are achieved, in accordance with this invention, by a servomotor comprising an emergency-braking device, the characteristics of which are easily adjustable. More specifically, the emergency-braking device may be adjusted as a unit. The parameters to be adjusted are the actuating force of the emergency-braking assistance device, as well as the jump value, which is defined by the relative position of the floating element and of the annular ring, the adjustment of the actuating force of the emergency-braking assistance device being carried out as a function of the stiffness of the spring provided in the device.

In other words, the emergency-braking assistance device comprises first elements, capable of an axial plastic deformation in the course of the manufacturing process of the servomotor, so as to increase the spring load up to the desired load value, and it also comprises second elements capable of an axial plastic deformation for a relative motion, in the course of the manufacturing, of the rear face borne by the floating element, and of the rear face, which is borne by the annular ring, in order to achieve an accurate adjustment of the jump.

The main subject of this invention is a pneumatic servomotor for an assisted braking, which comprises a casing having a longitudinal axis and in which a low-pressure chamber and a variable-pressure chamber are defined, in an airtight manner, by a moving partition wall bearing a pneumatic piston in its middle part, a three-way valve, arranged in the rear part of the pneumatic piston and controlled by an actuating rod, the three-way valve comprising a valve for a reequalization between the low-pressure chamber and the variable-pressure chamber, and a valve for the high-pressure supply of the variable-pressure chamber, said supply valve comprising a valve seat borne by a first longitudinal end of a distributor plunger and receiving a longitudinal end of the actuating rod, said distributor plunger having, at a second longitudinal end, situated in the opposite direction relative to the first longitudinal end, a finger, which is perpendicular to the longitudinal axis and which comes into contact with a face of the reaction disk on a braking operation, said reaction disk being accommodated in a housing integral with a push rod for the actuation of a master cylinder, said housing comprising a pneumatic braking-assistance device, fitted with a cage, a first closed longitudinal end of which is integral with the push rod while its second open longitudinal end is closable by an annular ring integral with the cage, and by a reaction piston fitted for a sliding travel inside the ring along the longitudinal axis, said piston being reactionnally kept against the ring by a resilient biasing means, which bears by its rear end on the first closed end of the cage, and wherein the area consisting of the rear faces of the annular ring and of the reaction piston, respectively, constitutes the front longitudinal end of the housing of the reaction disk, characterised in that said device comprises plastically-deformable means for the adjustment of the braking characteristics.

Another subject matter of the present invention is a servomotor, characterised in that the resilient means is a helical spring.

Another subject matter still of the present invention is a servomotor, characterised in that the first means are capable of setting a predetermined value to a clearance between the planes containing the rear faces of the reaction piston and of the annular ring, respectively.

The present invention also deals with a servomotor, characterised in that the first means are disposed between a front face of the annular ring and a rear face of a flange extending radially outwards from the periphery of the body of the reaction piston.

According to another aspect of the invention, such servomotor is characterised in that said first means consist of a collar.

According to another aspect still of the invention, such servomotor is characterised in that said first means consist of a ring-shaped protrusion made in one piece with the annular ring and extending axially forwards from the front face of the annular ring.

Another subject matter of the present invention is a servomotor, characterised in that said first means consist of a ring-shaped protrusion made in one piece with the flange and extending axially rearwards from the rear face of the flange.

Another subject matter still of the present invention is a servomotor, characterised in that the second means are capable of setting a predetermined value to the stressing of the resilient means.

According to another aspect of the invention, such servomotor is characterised in that the second means are accommodated inside the emergency-braking assistance device, so as to modify the axial position of the first closed end of the cage relative to the reaction piston.

Another subject matter of the present invention is a servomotor, characterised in that the second means consist of a collar, disposed between the front face of the annular ring and the rear face of an inner bearing surface of the cage.

According to another aspect of the invention, such servomotor is characterised in that the second means consist of a ring-shaped protrusion made in one piece with the annular ring and extending axially from the front face of the annular ring towards an inner bearing surface of the cage.

This invention also deals with a servomotor, characterised in that the cage comprises a sleeve, which is closed at its first front longitudinal end by a cap integral with the push rod, and in that the second means are disposed between the front longitudinal end of the sleeve and a rear face of the cap.

Another subject matter of the present invention is a servomotor, characterised in that the second means consist of a ring-shaped protrusion made in one piece with the sleeve and extending axially towards the cap.

According to another aspect still of the present invention, a servomotor is characterised in that said cap is interlocked with the sleeve by means of a ring-shaped extension, which is arranged radially outside relative to the ring-shaped protrusion constituting the second means, and capable of folding over onto the front face of the cap, owing to a plastic deformation.

The present invention also deals with a manufacturing process for a pneumatic servomotor for an assisted braking, fitted with an emergency-braking assistance device according to the present invention, characterised in that it comprises, among other features a preliminary step, in which the first means are plastically deformed in an axial direction so as to set a predetermined value to the clearance between the rear faces of the reaction piston and of the annular ring, respectively a subsequent step, in which the second means are plastically deformed in an axial direction so as to set a predetermined value to the stressing of the resilient means.

Another subject matter of the present invention is a device for the implementation of the preliminary step of the process according to the present invention, characterised in that it comprises a first element and a second element, movable relative to the first element along the longitudinal axis, said first element having a reference surface, which defines the predetermined value of the clearance, while the second element comprises a ring-shaped pressing surface, which cooperates with the front face of the flange of the reaction piston.

Another subject matter still of the present invention is a device for the implementation of the subsequent step of the process according to the present invention, characterised in that it comprises a third element and a fourth element, movable relative to the third element along the longitudinal axis, said third element having a ring-shaped supporting surface for the front face of the annular ring, and a means for the detection of the force applied to the reaction piston by the resilient means, while the fourth element comprises a surface for a force application to the cage, so as to deform the second means plastically in the course of an axial travel of the fourth element towards the third element, in such a way that the load applied to the resilient means is equal to the predetermined value.

Other features and advantages of the present invention will be apparent from the following detailed description, when taken in conjunction with the accompanying drawings, in which FIG. 1 is a longitudinal sectional view, showing a servomotor of a known type;

FIG. 4 is a detail view of the servomotor shown in FIG. 3;

FIG. 5 is a longitudinal sectional view, showing a detail of a first implementation of a second embodiment of a servomotor according to the present invention;

FIG. 6 is a longitudinal sectional view, showing a detail of a second implementation of the second embodiment of a servomotor according to the present invention;

As a rule, the rear part of an element refers to the part of the element which is facing in the direction of the control rod, whereas the front part of the element means the part of said element, which is facing in the direction of the push rod.

A "plastically-deformable element" means an element, the shape of which was altered owing to the application of a minimum force in the course of a manufacturing step, such shape being the final shape exhibited by the element once mounted in the device it is a constituent piece of, and therefore the element is no longer subjected to any stress likely to deform it in a non-temporary manner.

Figure 1:
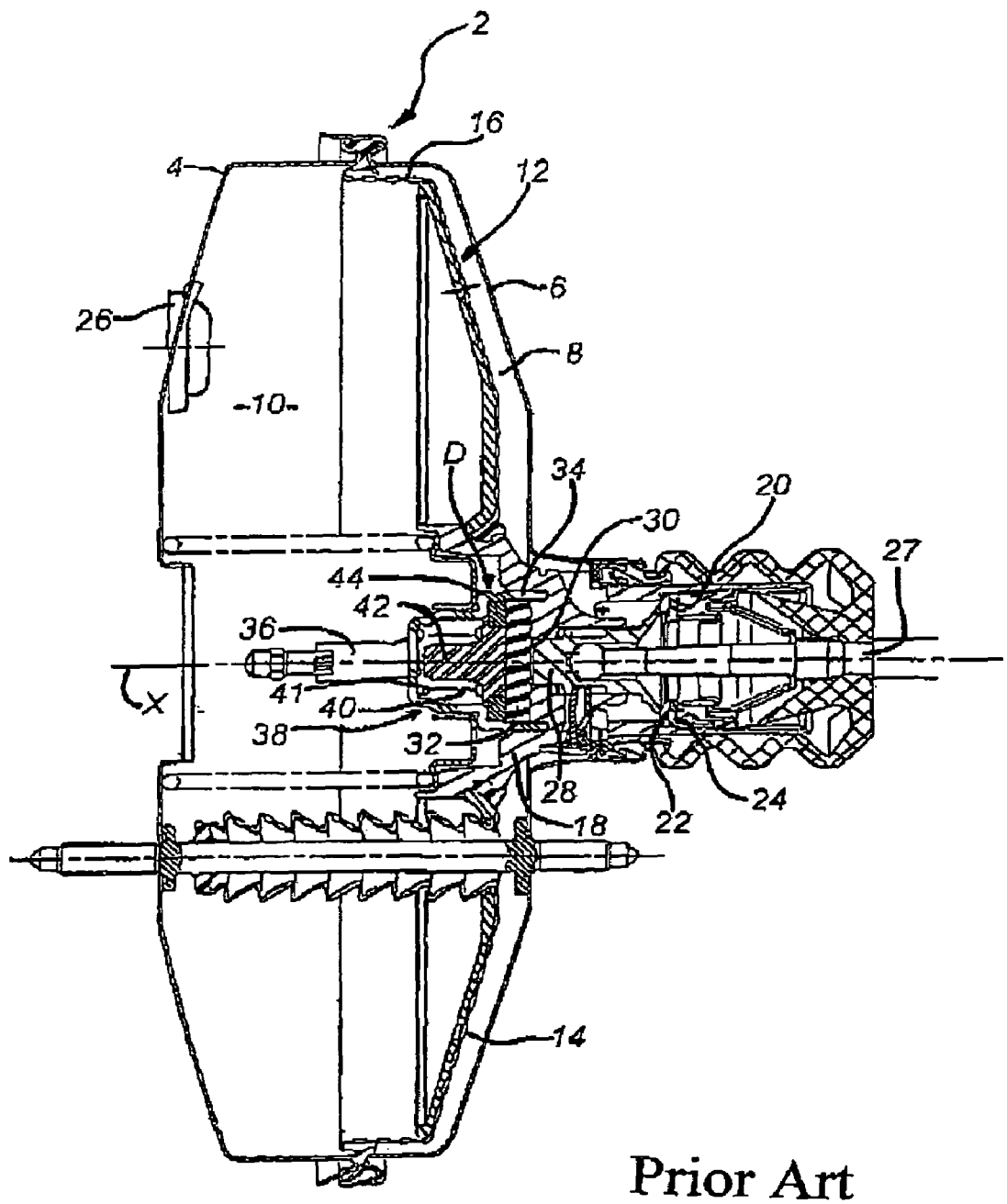
Figure 2:
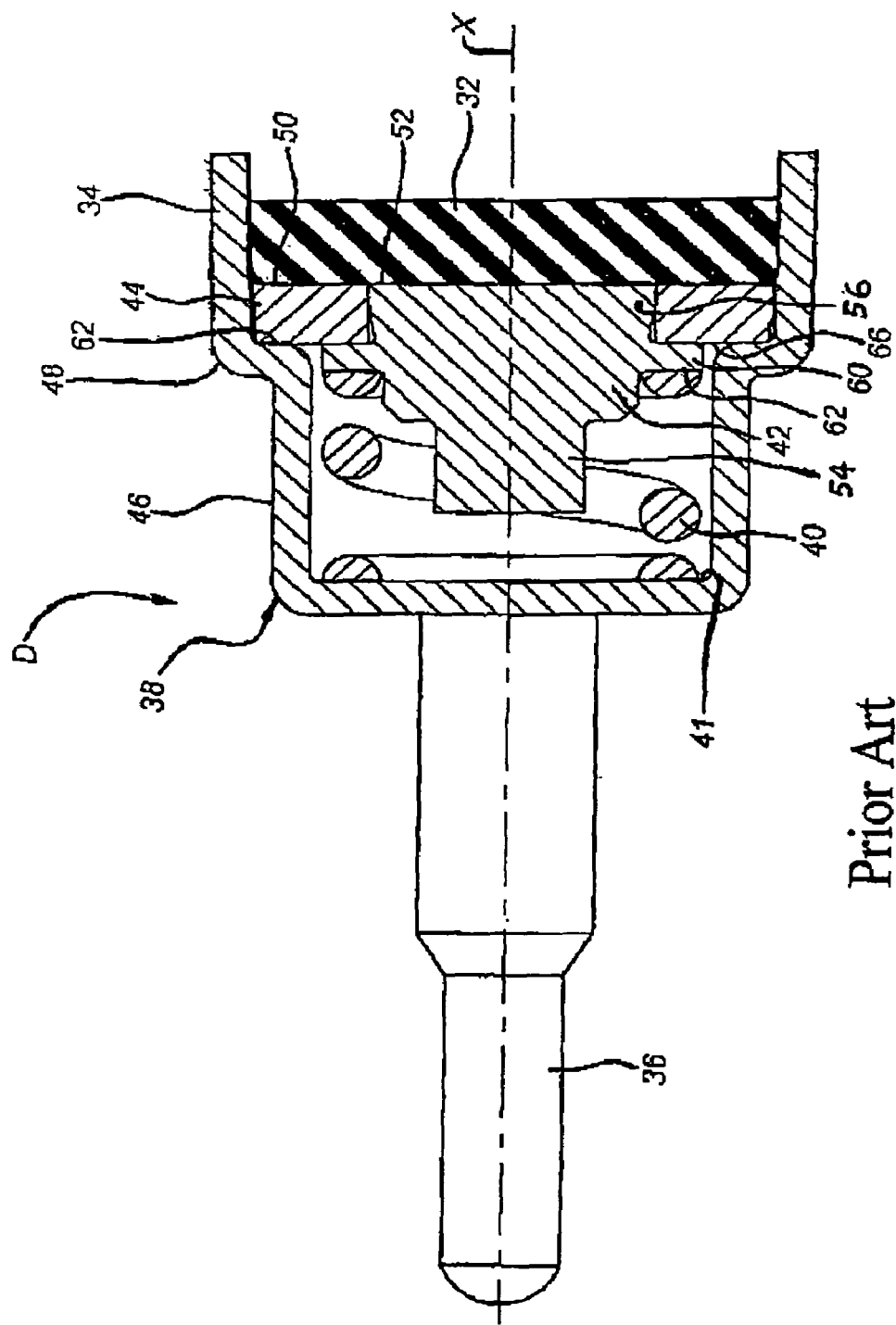
FIG. 2 is a detail view of the servomotor shown in FIG. 1.

FIG. 1 shows a servomotor of a known type, having a longitudinal axis X and comprising a casing 2 consisting of a first shell 4 and of a second shell 6, defining an inner space. The servomotor also comprises a moving partition wall 12 dividing the inner space, in an airtight manner, into a rear variable-pressure chamber 8 and a front low-pressure chamber 10.

The moving partition wall 12 consists of a skirt 14 and of a diaphragm 16, which is a flexible unfolding one, integral in an airtight manner with both the outer periphery of the skirt 14 and the casing 2 of the servomotor.

The skirt 16 comprises a central opening, in which a pneumatic piston 18 is stationarily mounted, said piston accommodating, at its rear part, a three-way valve 20, which is actuated by a control rod 27 connected with a brake pedal (not shown).

The three-way valve 20 comprises a reequalizing valve 22 which, at rest, interconnects the front chamber 10 with the rear chamber 8 and, on a braking operation, separates them, and a supply valve 24, which supplies the rear chamber 8 with a high-pressure pneumatic fluid, for instance with atmospheric-pressure ambient air.

The front chamber is connected through a coupler 26 to a low-pressure source, e.g. a vacuum pump.

The toggle-shaped front longitudinal end of the control rod 27 is received in a rear end of a distributor plunger 28, which also constitutes a seat for the supply valve 24.

The distributor plunger 28 comprises, at its front longitudinal end 30, a finger capable of coming into contact with a rear face of a reaction disk 32, accommodated inside a cup-shaped housing 34, which is integral with a push rod 36, for the actuation of a piston (not shown) of a master cylinder.

The servomotor also comprises a braking-assistance device D which, when the actuating force exerted on the brake pedal is higher than a determined value, makes it possible to increase the jump of the servomotor.

The device D constitutes the housing 34 for the reaction disk 32 and it comprises a substantially U-shaped cage 38 extending in the longitudinal direction and the U-shape bottom of which is connected stationarily with the push rod 36. A resilient means, e.g. a helical spring 40, is compressively fitted between a rear face 41 of the bottom of the cage 38 and a floating element 42, or a reaction piston, which closes the open rear end of the U-shape, in co-operation with an annular ring 44 surrounding the reaction piston 42 and mounted stationarily relative to the cage 38.

The reaction piston 42 comprises a first front comparatively smaller-diameter portion 54 and a second greater-diameter portion 56. The greater-diameter portion 56, the outer diameter of which is equal to the inner diameter of the ring 44, is arranged for a sliding motion in the annular ring. The reaction piston 42 also comprises a ring-shaped flange 60, extending radially outwards from the greater-diameter portion 56.

The flange 60 has a supporting surface 62 for the rear longitudinal end of the spring 40, and a surface 64 which, at rest, bears on a front face 66 of the annular ring 44.

The position of the rear face 52 of the reaction piston 42 relative to the rear face 50 of the annular ring 44 is defined by the clearance j (not shown) between the planes containing the rear faces 52 and 50, and it is involved in the determination of the jump height of the servomotor.

In the subsequent description, when an alignment of the rear faces 52, 50 is mentioned, it will mean that the distance between the planes containing these faces is in the range from 0 to 0.3 mm.

The cage 38 comprises a first comparatively-smaller diameter front portion 46, a second greater-diameter rear portion 48, which is connected to the comparatively-smaller diameter portion 46 through a radial shoulder 47, which forms a radial inner bearing surface for the front face 66 of the annular ring 44.

The housing 34 of the reaction disk is constituted by a rear section of the second greater-diameter portion 48, by the rear face 50 of the ring 44 and by a rear face 52 of the reaction piston 42.

The ring 44 is formed as a unit with the cage 38, for instance by crimping, but an adhesive bonding might also be contemplated.

Since the mode of operation of the above-described servomotor is known from the state of the art, it will not be further explained herein, yet the mode of operation of the braking assistance device D will now be described more circumstantially.

If the braking force applied to the brake pedal is lower than the predetermined value Fp, which corresponds to a force at the reaction disk which is lower than the stressing amount of the spring 40, the reaction piston 42 stands still relative to the annular ring 44, and the reaction force is transmitted to the distributor plunger in a well-known manner.

If the braking force applied to the brake pedal remains higher than the predetermined value Fp, which corresponds to a force at the reaction disk which is higher than the stressing amount of the spring 40, then the reaction piston 42 travels in the direction of the push rod 36, thus enabling an extrusion of the reaction disk 34, and modifying the stress distribution inside the reaction disk, which brings about an increase in the assistance ratio.

In such a case, one becomes aware of the importance of the adjustment of the spring load for the determination of the limit triggering force Fp, as well as of the necessary alignment of the rear faces 50, 52 of the annular ring 44 and of the reaction piston 42 respectively, so as not to alter the behaviour of the servomotor in the course of a comfort braking operation.

Well, the present invention makes it possible to carry out, at one and the same time, the adjustment of the prestressing of the spring 40 and, therefore, of the value of the force Fp.

The value of the jump of the servomotor can also be adjusted through the adjustment of the axial clearance j between the rear faces 50, 52 of the annular ring 44 and of the reaction piston 42, respectively.

According to the present invention, first elements 68, capable of a plastic deformation along the axis X, are provided for an adjustment of the axial clearance j between the rear face 50 of the annular ring 44 and the rear face 52 of the reaction piston 42. These means are disposed between the front face 66 of the ring 44 and the rear face 62 of the flange 60.

Figure 3:
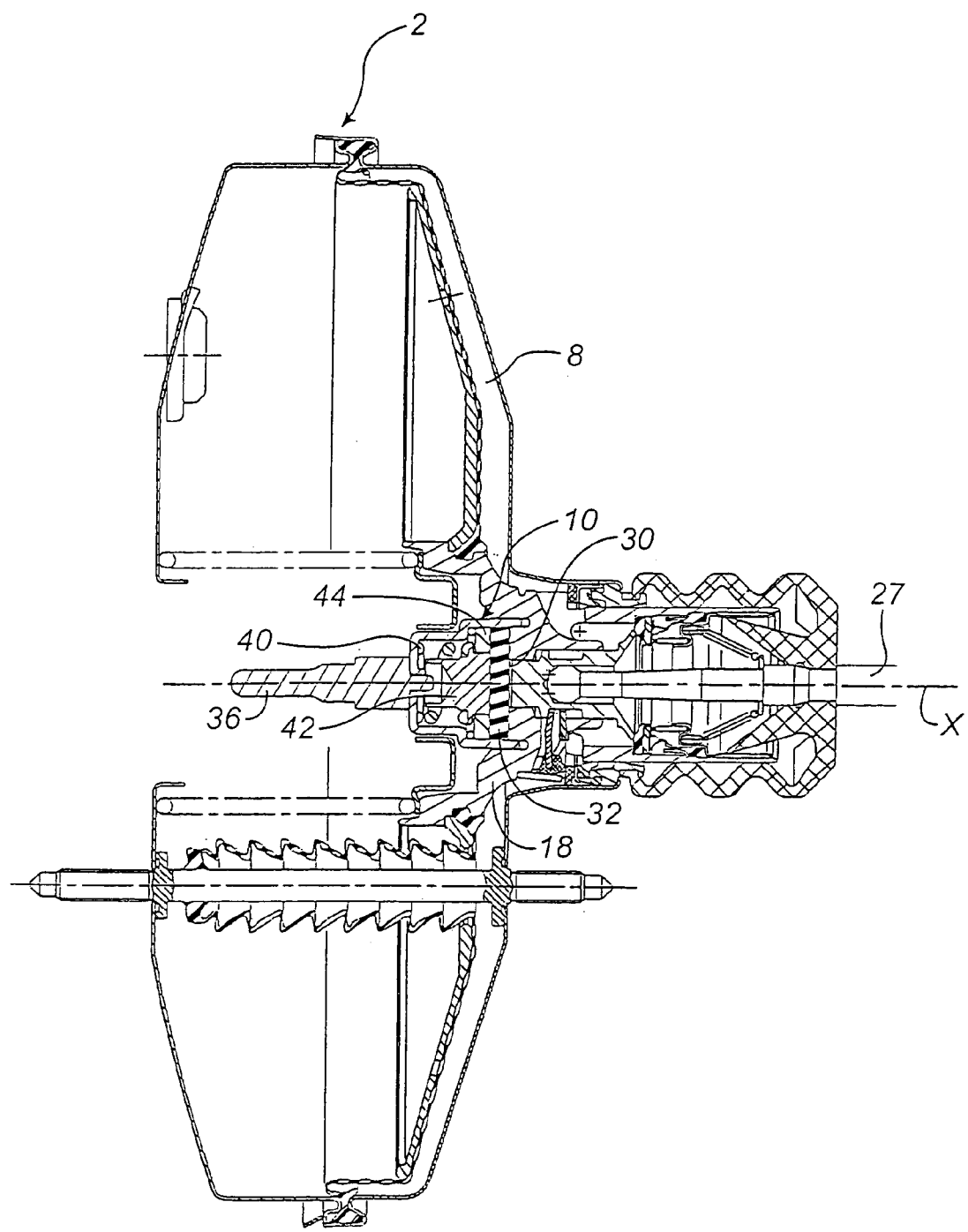
FIG. 3 is a longitudinal sectional view, showing a first embodiment of a servomotor according to this invention.

FIGS. 3 and 4 show a first embodiment of a device D according to the present invention. Such device comprises said first means 68 consisting of a plastically-deformable collar 70, made e.g. of steel or of an aluminum alloy.

In an advantageous manner, the rear face of the flange 60 comprises a shoulder 61 for a transverse retaining of the collar 70.

FIGS. 5 and 6 explain how the clearance j is adjusted between the rear faces 52 and 50 of the first means 68, consisting of a ring-shaped protrusion, which is provided on the rear face 62 of the flange 60 according to a first implementation (FIG. 5), or provided on the front face 66 of the annular ring 44 according to a second implementation (FIG. 6), such protrusion extending rearwards or forwards, respectively, along the axis X.

Most advantageously, the protrusion is made in one piece either with the reaction piston 42 according to the first implementation, or with the ring 44 according to the second implementation.

Yet, a ring-shaped protrusion consisting of a separate sleeve, arranged between the faces 62 and 66, might just as well be contemplated.

It stands to reason that the first means 68 must be capable of a long enough extension along the axis X so as to connect up both faces between which they are interposed, when the predetermined value Vj of the clearance j is reached.

According to the present invention, the device D comprises advantageously second plastically-deformable means 74 for the adjustment of the stressing amount of the resilient means 40, through a change in the distance between the rear face 41 of the bottom of the cage 38 fastened to the push rod 36, and the front face 64 of the flange 60.

As illustrated in FIG. 4; the second means 74 consist of a plastically-deformable collar 76, interposed between the front face 66 of the annular ring and the inner bearing surface 47 of the cage 38, in which case the collar 76 is used as an axial supporting means for the annular ring 44.

In an advantageous manner, the collar is made of a material exhibiting a high ultimate elongation value, such as steel, aluminum alloys or copper alloys.

FIGS. 5 and 6 show two implementations of a second embodiment of the device D according to the present invention. Here, the second plastically-deformable means 74 consist of a ring-shaped protrusion, extending along the axis X from the front face of the annular ring 44 in a first implementation (FIG. 5), and resting on the ring-shaped bearing surface 47 of the cage 38. In a second implementation, the cage 38 comprises a sleeve 381, which is closed at its front longitudinal end 383 by a cap 382, which is held on the sleeve 381 owing to a deformation of a longitudinal extension 385 of the sleeve.

The front longitudinal end 383 of the sleeve comprises a ring-shaped shoulder 384 at its inner periphery, defining the smaller-thickness longitudinal extension 385 relative to the thickness of the sleeve and folding over onto the periphery of the cap so as to keep it in position.

In that case, the second means 74 consist of a ring-shaped protrusion provided on the shoulder 384 and bearing on the rear face of the cap 382.

As regards the second implementation, as shown in FIG. 6, the annular ring is made in one piece with the sleeve 381, in which case the reaction piston 42 is fitted through the front longitudinal end of the sleeve 381, before its being closed by the cap 382.

Of course, the axial dimension of the second means 74 is determined in such a way that the distance, between both stops of the spring 40 prior to the deformation of the second means 74, implies a spring load, which is lower than, or equal to, the required one.

Most avantageously, the device D according to the present invention comprises the first and second plastically-deformable means, 68 and 74 respectively. Yet, a device might just as well be contemplated, in which the first means 68 or the second means 74 would be plastically deformable depending on the manufacturing and adjusting requirements.

The manufacturing process according to the present invention for a servomotor fitted with an emergency-braking assistance device D according to the present invention, comprises, in an advantageous manner and among other features a preliminary step A, in which the clearance j for the alignment of the rear face 50 of the annular ring 44 with the rear face 52 of the reaction piston 42 is set to a predetermined value Vj by a plastic deformation of the first plastically-deformable means, more particularly by a decrease in their axial extension;

a subsequent step B, in which the stressing ch of the spring is set to a predetermined value Vch, by a deformation of the second plastically-deformable means 74, more particularly by a decrease in their axial extension.

Figure 7:
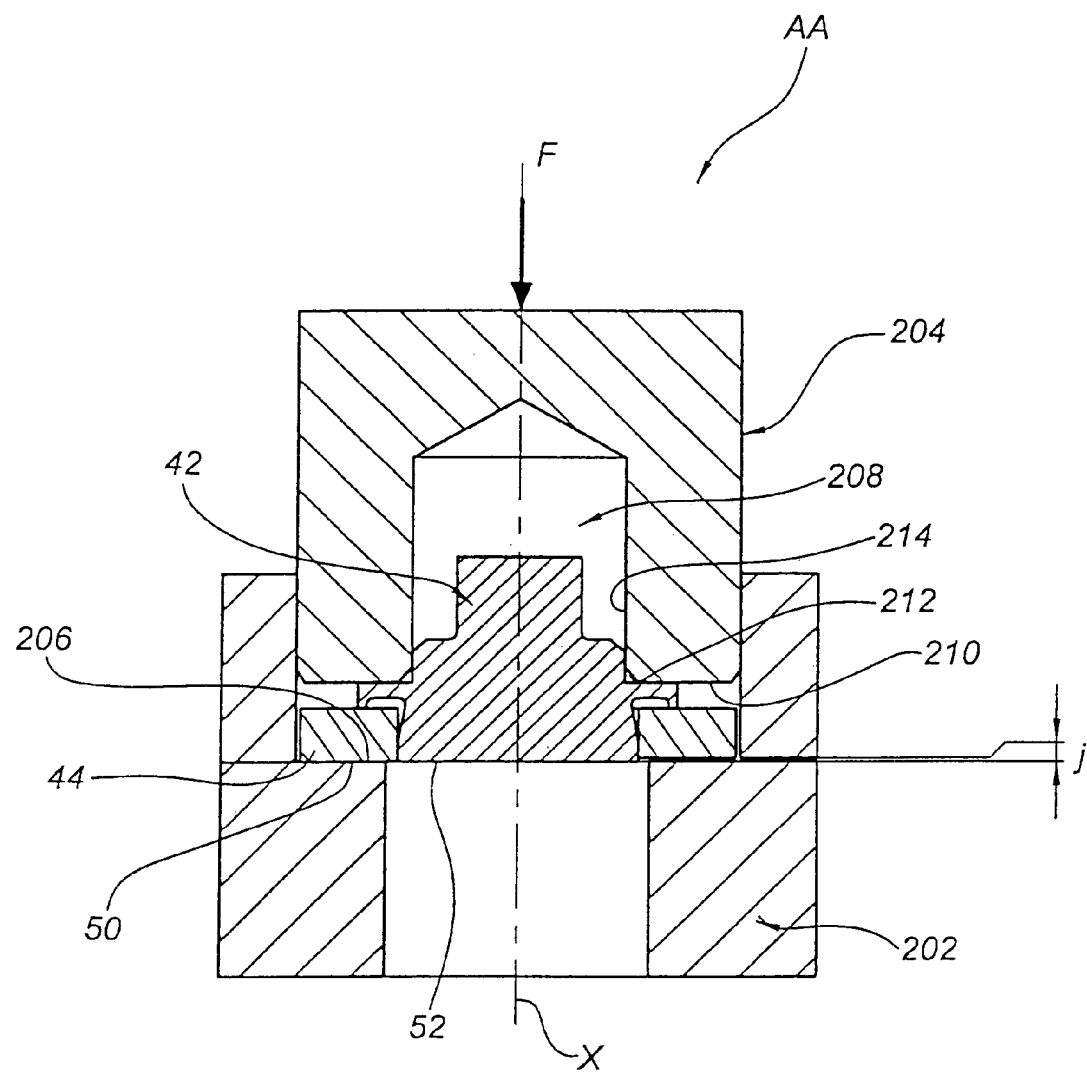
FIG. 7 is a schematic view of a device for the implementation of a manufacturing process for a servomotor according to this invention, and representing a first manufacturing step.

FIG. 7 shows a device AA for the implementation of the step A of the process according to the present invention. Such device, having an axis X, comprises a first element 202 for the adjustment of the clearance j to the value Vj, between the rear face 50 of the annular ring 44 and the rear face 52 of the reaction piston 42, and it also comprises a second element 204, movable relative to the first element for a deformation of the first plastically-deformable means so as to set the clearance j permanently to the value Vj.

The first element 202 is provided with a plane surface 206, e.g. a platen.

The second element 204 comprises a receiving cavity 208, consisting of a blind bore, the inner diameter of which is, in an advantageous manner, substantially equal to the diameter of part of the greater-diameter portion, thus forming a lateral retaining means.

Most advantageously, the open end of the bore 214 exhibits a bevel 212 for an easier fitting of the reaction piston 42.

A pressing surface 210, perpendicular to the axis X and provided around the open end of the bore 214, cooperates with the front face 64 of the flange.

The second element 204 is movable along the longitudinal axis X so as to deform the first means 68 when it is moved as indicated by the arrow F.

Now the adjusting process will be described for the clearance j as regards the alignment between the rear faces 50, 52 of the ring 44 and of the reaction piston 42, respectively.

The ring 44 is put on the platen 206 in such a way that the rear face 50 of the ring touches the platen;

the reaction piston 42 is inserted in the ring 44, in such a way that its rear face 52 faces the platen 206;

the second element 204 is disposed about the reaction piston 42, for instance through a sliding motion along the axis X;

the second element 204 is moved axially, as shown by the arrow, in such a way that the face 212 of the second element 204 comes into contact with the face 64 of the flange, with the result that the first means 68 will undergo an axial deformation till the rear face 52 of the reaction piston 42 is in contact with the platen 206. Such contact may be established, for instance, by a measurement of a force, the value of which must be in the range between the value of the plastic deformation of the flange and the value of the plastic deformation of the reaction piston;

then, the second element 204 is moved axially backwards relative to the arrow F, so as to take out the assembly consisting of the ring 44 and of the piston 42.

The device AA may also be applied to the other embodiments of the first means 68, as illustrated in FIGS. 5 and 6.

Figure 8:
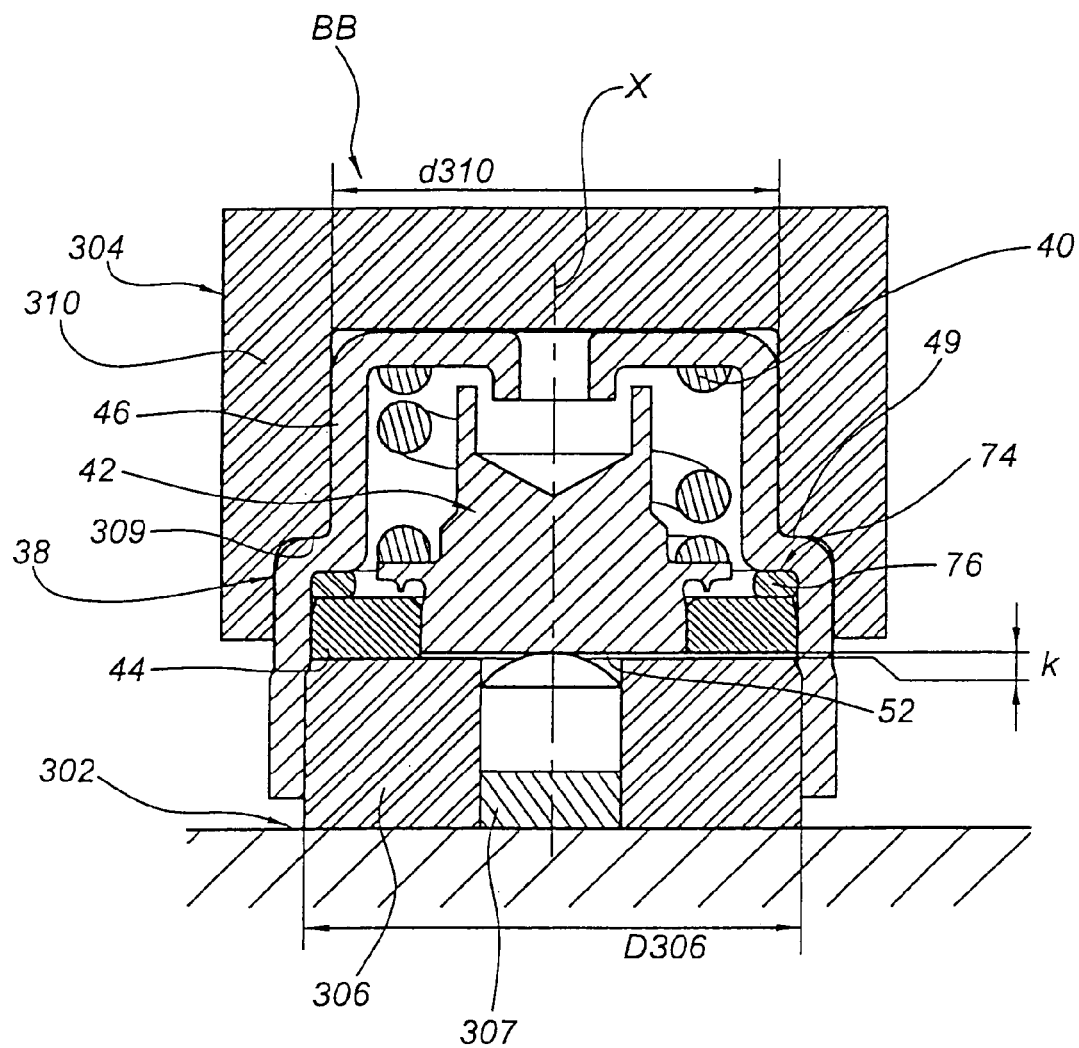
FIG. 8 is a schematic view of a device for the implementation of a manufacturing process for a servomotor according to this invention, and representing a second manufacturing step.

FIG. 8 shows a device BB for the implementation of the step B of the process according to the present invention. Such device, having an axis X, comprises a stationary third element 302 and a fourth element 304, capable of a translational motion along the axis X so as to draw nearer to the third element 302.

The third element 302 comprises a tubular element 306, the outer diameter D306 of which is at most equal to the inner diameter of the greater-diameter portion 48 of the cage 38. The third element 302 also comprises a force sensor 307, arranged in the central passage of the tubular element 306 and in contact with the rear face 52 of the reaction piston 42, so as to measure the force applied by the spring 40 onto the reaction piston 42.

The force sensor measures a prestress of the spring, which corresponds to the prestress of the spring in the fitting position plus a prestress, which is artificially caused by a predetermined clearance h, provided for the measurement between the rear face 52 of the reaction piston 42 and the front face of the tubular element 306.

The fourth element 304 is capable of a translational motion along the longitudinal axis X, and it comprises an advantageously ring-shaped pressing surface 308 which, on the manufacturing, is applied onto an outer bearing surface 49 of the cage 38.

For instance, the pressing surface 308 consists of the longitudinal end of a tubular sleeve 310, the inner diameter d310 of which is at least equal, and more advantageously equal, to the comparatively smaller-diameter portion 46 of the cage 38, thus forming a guiding means for the translational motion of the fourth element 304 along the axis X, relative to the cage 38.

Now, the adjusting procedure will be described for the compression stressing of the spring 40 to a value Vch.

The device D is put on the third element 302 in such a way that the rear face 50 of the ring 44 rests on the third element 302, and so that the force sensor may be in contact with the reaction piston;

the fourth element 304 is disposed, e.g. through a sliding motion along the axis X, about the comparatively smaller-diameter portion d46;

a clearance k is created between the face 52 of the reaction piston 42 and the front face of the element 306;

then the fourth element 304 is moved axially, as shown by the arrow, in such a way that the face 308 of the fourth element 304 comes into contact with the rear bearing surface 49 of the cage 38, with the result that the second means 74 are being deformed till the force sensor measures, through the reaction piston 42, a spring load, which is equal to Vch;

and the fourth element 304 is moved axially backwards relative to the arrow, so as to take out the assembly consisting of the ring 44 and of the piston 42.

It is to be understood that a combination of the first means 68 and of the second means 74 in a different manner from that shown in the above-described embodiments does not depart from the scope of the present invention.

Therefore, this invention provides a pneumatic servomotor for an assisted braking, fitted with an emergency-braking assistance device, the triggering of which is determined in an accurate manner. Besides, the present invention makes it possible to set the jump height of said servomotor with a high accuracy too.

The present invention mainly applies to the design and manufacturing of braking systems for private cars.

What is claimed is:

1. A pneumatic servomotor for assisted braking, comprising a casing (2) having a longitudinal axis (X) and in which a low- pressure chamber (10) and a variable-pressure chamber (8) are defined, in an airtight manner, by a moving partition wall (12) bearing a pneumatic piston (18) in its middle part, a three-way valve (20), arranged at the rear part of the pneumatic piston (18) and controlled by an actuating rod (27), the three-way valve comprising a first valve (22) for a re-equalization between the low-pressure chamber (10) and the variable-pressure chamber (8), and a second valve (24) for the high-pressure supply of the variable-pressure chamber (8), said second valve (24) comprising a valve seat, borne by a first longitudinal end of a distributor plunger (28) and receiving a longitudinal end of the actuating rod (27), said distributor plunger (28) having, at a second longitudinal end in the opposite direction relative to the first longitudinal end, a finger (30), which is perpendicular to the longitudinal axis (X) and which comes into contact with a face of a reaction disk (32) on a braking operation, said reaction disk (32) being accommodated in a housing (34) integral with a push rod (36) for providing an output force to actuate a master cylinder corresponding to an input force applied to said actuating rod (27), said housing (34) comprising a pneumatic braking-assistance device (D) fitted with a cage (38), a first closed longitudinal end of which is integral with the push rod (36) while a second open longitudinal end is closable by an annular ring (44) integral with the cage (38) and by a reaction piston (42) fitted for a sliding travel inside the ring (44) along the longitudinal axis (X), said reaction piston (42) being reactionnally kept against the ring (44) by a resilient means (40) having a prestress (ch) and bearing by a rear end on the closed first end of the cage (38), and wherein an area consisting of the rear faces (50, 52) of the annular ring (44) and of the reaction piston (42), respectively, constitutes the front longitudinal end of the housing (34) of the reaction disk, characterized in that said device comprises plastically-deformable means (68, 74) for the adjustment of a ratio of the input force to the output force to facilitate a quick stop for a vehicle.

2. The pneumatic servomotor according to claim 1, characterized in that the resilient means (40) is a helical spring.

3. The pneumatic servomotor according to claim 1, characterized in that the first means (68) are capable of setting a predetermined value (Vj) to a clearance (j) between the planes containing the rear faces (52, 50) of the reaction piston (42) and of the annular ring (44), respectively.

4. The pneumatic servomotor according to claim 1, characterized in that the first means (68) are disposed between a front face (66) of the annular ring (44) and a rear face (62) of a flange (60) extending radially outwards from the periphery of the body of the reaction piston (42).

5. The pneumatic servomotor according to claim 1, characterized in that said first means (68) consist of a collar.

6. The pneumatic servomotor according to claim 4, characterized in that said first means (68) consist of a ring-shaped protrusion, made in one piece with the annular ring (44) and extending axially forwards from the front face (66) of the annular ring.

7. The pneumatic servomotor according to claim 4, characterized in that said first means (68) consist of a ring-shaped protrusion, made in one piece with the flange (60) and extending axially rearwards from the rear face (62) of the flange (60).

8. The pneumatic servomotor according to claim 7, characterized in that the second means (74) are capable of setting a predetermined value (Vch) to the stressing (ch) of the resilient means (40).

9. The pneumatic servomotor according to claim 8, characterized in that the second means (74) are accommodated inside the emergency-braking assistance device (D) so as to modify the axial position of the closed first end of the cage (38) relative to the reaction piston (42).

10. The pneumatic servomotor according to claim 9, characterized in that the second means (74) consist of a collar, disposed between the front face (66) of the annular ring (44) and the rear face of an inner bearing surface (47) of the cage (38).

11. The pneumatic servomotor according to claim 9, characterized in that the second means (74) consist of a ring-shaped protrusion, made in one piece with the annular ring (44) and extending axially from the front face (66) of the annular ring towards an inner bearing surface (47) of the cage (38).

12. The pneumatic servomotor according to claim 9, characterized in that the cage (38) comprises a sleeve (381), which is closed at its first front longitudinal end (383) by a cap (382) integral with the push rod (36), and in that the second means (74) are disposed between the front longitudinal end of the sleeve (381) and a rear face of the cap (382).

13. The pneumatic servomotor according to claim 12, characterized in that the second means (74) consist of a ring-shaped protrusion, made in one piece with the sleeve (381) and extending axially towards the cap (382).

14. The pneumatic servomotor according to claim 13, characterized in that said cap (382) is interlocked with the sleeve (381) by means of a ring-shaped extension, which is arranged radially outside relative to the ring-shaped protrusion constituting the second means (74), and capable of folding over onto the front face of the cap (382) owing to a plastic deformation.

15. A manufacturing process for a pneumatic servomotor for an assisted braking, fitted with an emergency-braking assistance device (D, said device (D) being defined by a cage(38) that is integral with a push rod (36), retains a reaction disk (32), and is closable by an annular ring (44) integral with the cage (38) wherein a reaction piston (42) slides within the ring (44) and is retained against the ring (44) with a prestress (ch) from a resilient means (40) and wherein an area consisting of the rear faces (50,52) of the annular ring (44) and of the reaction piston (42), respectively, constitutes a front longitudinal end of the cage (38) and wherein plastically-deformable means (68, 74) may be modified to adjust a ratio of an input force to an output force during a brake application to facilitate a quick stop for a vehicle, characterized in that the modification of the plastically-deformable means includes the following steps:

a preliminary step, in which the first means (68) are plastically deformed in an axial direction so as to set a predetermined value (Vj) to a clearance (j) between the rear faces (52, 50) of the reaction piston (42) and of the annular ring (44), respectively; and a subsequent step, in which the second means (74) are plastically deformed in an axial direction so as to set a predetermined value (Vch) to the stressing (ch) of the resilient means (40).

16. The manufacturing process wherein the device (D for the implementation of the preliminary step in claim 15 is characterized by a first element (202) and a second element (204), movable relative to the first element (202) along the longitudinal axis (X), said first element (202) having a reference surface, which defines the predetermined value (Vj) of the clearance (j), while the second element (204) comprises a ring-shaped pressing surface, which cooperates with the front face (64) of a flange (60) of the reaction piston (42).

17. The manufacturing process for the implementation of the subsequent step in claim 16, characterized by the device (D) including a third element (302) and a fourth element (304), movable relative to the third element (302) along the longitudinal axis (X), said third element having a ring-shaped supporting surface for the front face (66) of the annular ring, and a means (307) for the detection of the force applied to the reaction piston (42) by the resilient means (40), while the fourth element (304) comprises a surface for a force application to the cage (38), so as to deform the second means (74) plastically in the course of an axial travel of the fourth element (304) towards the third element (302), in such a way that the stressing of the resilient means (40) is equal to the predetermined value (Vch).

* * * * *